US008555654B2

(12) United States Patent
Lewis et al.

(10) Patent No.: US 8,555,654 B2
(45) Date of Patent: Oct. 15, 2013

(54) GAS TURBINE ENGINE SWIRLED COOLING AIR

(75) Inventors: Leo V. Lewis, Kenilworth (GB); Timothy J. Scanlon, Derby (GB)

(73) Assignee: Rolls-Royce, PLC, London (GB)

( * ) Notice: Subject to any disclaimer, the term of this patent is extended or adjusted under 35 U.S.C. 154(b) by 0 days.

(21) Appl. No.: 13/399,424

(22) Filed: Feb. 17, 2012

(65) Prior Publication Data

US 2012/0227414 A1 Sep. 13, 2012

(30) Foreign Application Priority Data

Mar. 8, 2011 (GB) .................................. 1103890.8

(51) Int. Cl.
*F02C 6/08* (2006.01)

(52) U.S. Cl.
USPC ........................................................ 60/782

(58) Field of Classification Search
USPC ............. 60/782, 785, 805–806; 415/115–117
See application file for complete search history.

(56) References Cited

U.S. PATENT DOCUMENTS 3,043,561 A * 7/1962 Scheper, Jr. .................. 415/115
3,647,313 A * 3/1972 Koff .............................. 415/115
3,936,215 A * 2/1976 Hoff .............................. 415/115
4,741,153 A 5/1988 Hallinger et al.
4,822,244 A * 4/1989 Maier et al. ..................... 416/95
5,310,319 A * 5/1994 Grant et al. ............... 416/220 R
7,712,317 B2 5/2010 Scanlon
8,381,533 B2 * 2/2013 Smoke et al. .................. 60/806

OTHER PUBLICATIONS

Jun. 16, 2011 Search Report issued in British Application No. GB1103890.8.

* cited by examiner

*Primary Examiner* — Phutthiwat Wongwian
(74) *Attorney, Agent, or Firm* — Oliff & Berridge, PLC

(57) ABSTRACT

A gas turbine engine has in flow series a compressor section, a combustor, and a turbine section. The engine includes a turbine section rotor disc, and a stationary wall forward of a front face or rearward of a rear face of the rotor disc. The wall defines a cavity between the stationary wall and the rotor disc, and has a plurality of air entry nozzles through which cooling air can be delivered into the cavity at an inlet swirl angle. The engine further includes a cooling air supply arrangement which accepts a flow of compressed air and supplies the compressed air to the nozzles for delivery into the cavity. The cooling air supply arrangement and the nozzles are configured such that the inlet swirl angle of the air delivered into the cavity can be varied between a first inlet swirl angle and a second inlet swirl angle.

8 Claims, 3 Drawing Sheets

(a) Prior Art (b) (c)

GAS TURBINE ENGINE SWIRLED COOLING AIR

BRIEF SUMMARY OF THE INVENTION

The present invention relates to the delivery of swirled cooling air in a gas turbine engine.

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a is first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

FIG. 2(*a*) shows a closer view of a rotor disc 24 of an intermediate-pressure turbine. A row of rotor blades 25 are attached to the rim 26 of the disc. A cavity 27 is formed between a front face of the disc and a stationary wall 28 forward of the disc. Cooling air C is introduced to the cavity, and passes through the cavity to exit at one or more locations. In the example shown, exit D is to seal the disc rim from ingestion of annulus gas G, exit E is to ventilate the disc rim blade fixing, and exit F is to feed downstream cavities and seals in the internal air system.

As shown schematically in FIG. 2(*b*), which is a view along the axis of the engine of a part of the downstream face of the stationary wall 28, the cooling air C is delivered into the cavity through a plurality of entry nozzles 29 which are circumferentially spaced around the wall.

The rotation of the disc 24 imparts windage power to the air flow passing through the cavity 27. This is potentially detrimental in several respects: (i) it reduces the power which can be transmitted through the turbine shaft to the attached compressor, (ii) it can contribute to the lost power in the overall performance cycle of the engine, and (iii) locally within the cavity it can generate high air temperatures, which in turn may require stronger materials to be specified for the disc or stationary components surrounding the cavity.

In older engines, the cooling air C is delivered axially. However, in more recent engines, the air is delivered at an inlet angle providing significant swirl in the direction of rotation R of the rotor disc 24 to reduce the windage power loss. For example, as shown schematically in FIG. 2(*c*), which is part of a hoop section at the radius of the nozzles 29 through the stationary wall 28 and the rotor disc 24, the nozzles can be formed as angled holes in the stationary wall giving an inlet angle $\alpha$ which is typically in the range from 60° to 80°.

The air flow through the cavity 27, and in particular the heat transfer coefficients (HTCs) the air flow generates on the disc front face, also play a part in the rate of heating or cooling of the disc in response to engine throttle transients. Transient blade tip clearances (T), through take-off (when the disc 24 is heating) and through reslam handling maneouvres (when the disc is cooling), are affected by the disc's rate of thermal response, with higher HTCs speeding up the disc response. A speeded up response can in turn affect transient "pinch point" closures, and alter the blade tip clearance rubs generated when running-in the engine. Depending on the thermal conditions on the opposite side of the disc, the disc front face HTCs may or may not affect the steady-state temperatures of the disc, but even if there is no effect on steady-state temperatures, there can still be an effect on subsequent steady-state running tip clearances resulting from alterations to the running-in rubs.

In engines where the air is introduced with significant swirl angle, the windage power loss can be small, but a result of inlet air being highly-swirled in the direction of rotor rotation tends to be a reduction in disc face HTCs. This leads to relatively slower disc responses, with consequential detrimental effects on tip clearances.

The present invention is at least partly based on the recognition that appropriate control of inlet swirl angle can enable windage loss to be reduced and/or blade tip clearances to be improved.

Accordingly, a first aspect of the present invention provides a gas turbine engine having in flow series a compressor section, a combustor, and a turbine section, the engine including:

a turbine section rotor disc, a stationary wall forward of a front face of the rotor disc or rearward of a rear face of the rotor disc, the wall defining a cavity between the stationary wall and the rotor disc, and having a plurality of air entry nozzles through which cooling air can be delivered into the cavity at an inlet swirl angle, and a cooling air supply arrangement which accepts a flow of compressed air bled from the compressor section and supplies the compressed air to the air entry nozzles for delivery into the cavity;

wherein the cooling air supply arrangement and the air entry nozzles are configured such that the inlet swirl angle of the air delivered into the cavity through the nozzles can be varied between a first inlet swirl angle and a different second inlet swirl angle.

For a given cavity geometry, a given configuration of air flows into and out of the cavity, and for a given mass flow rate, windage power loss is typically a function of the inlet swirl angle. Thus by varying the inlet swirl angle, e.g. as the engine operating condition changes, the windage power loss can be reduced further. In particular, as different engine operating conditions can lead to different configurations of air flows into and out of the cavity, and to different cooling air flow rates, the inlet swirl angle can be better optimised to reduce windage power loss.

Additionally or alternatively, by varying the inlet swirl angle appropriately during thermal transients, it is possible for both the transient and steady-state running tip clearances of the turbine stage to be improved.

The engine may have any one or, to the extent that they are compatible, any combination of the following optional features.

The air entry nozzles may be circumferentially spaced around the stationary wall. The air entry nozzles may be at substantially equal radial positions.

Typically, the cavity feeds cooling air: to seal the rim of the rotor disc against working gas ingestion, and/or to ventilate the fixing for rotor blades attached to the rim of the rotor disc, and/or to feed downstream cavities and seals.

The inlet swirl angle at a given nozzle can be defined as the angle between the direction of flow of the air delivered out of the exit of the given nozzle, ignoring any radial component to the direction of flow, and a line parallel to the axial direction of the engine at that exit, a positive angle indicating swirl in the direction of rotation of the rotor disc, and a negative angle indicating swirl in the opposite direction of rotation to that of the rotor disc. The first inlet swirl angle can then be a positive angle, and the second inlet swirl angle can be a positive angle less than first swirl angle, a zero angle or a negative angle. For example, the first inlet swirl angle may be in the range from +45° to +80°.

A first portion of the air entry nozzles may provide the first inlet swirl angle, and a second portion of the nozzles may provide the second inlet swirl angle, the cooling air supply arrangement having a switching system for switching the supplied compressed air between the first and the second portions to vary the inlet swirl angle. For example, nozzles of the first and second portions can alternate with each other in the circumferential direction around the stationary wall.

Preferably, the switching system supplies compressed air only to the nozzles of the first portion or only to the nozzles of the second portion, e.g. by employing a two-position valve to switch the compressed air supply. However, optionally, the switching system allows varying proportions of compressed air to be supplied simultaneously to the nozzles of the first and the second portions, e.g. by employing a multi-position or continuously-variable valve to switch the compressed air supply. Advantageously, by allowing varying proportions of compressed air to be supplied, intermediate amounts of swirl can be generated in the cooling air delivered into the cavity. This is particularly useful for optimising the amount swirl for different operating conditions to reduce windage losses, to reduce transient tip clearances and/or to control disc thermal stresses.

The first and second portions of the nozzles can be at the same radial height. Alternatively, the first portion of the nozzles can be at a first radial height and the second portion of the nozzles can be at a different second radial height. A greater radial height can be preferable for reducing the windage loss, while a lower radial height can be preferable for increasing HTCs.

A further option is that some of the nozzles of the first portion are at a first radial height and others of the nozzles of the first portion are at a different second radial height. Likewise, some of the nozzles of the second portion can be at the first radial height and others of the nozzles of the second portion can be at the second radial height.

A second aspect of the present invention provides a method of operating a gas turbine engine having in flow series a compressor section, a combustor, and a turbine section, a cavity being defined between a turbine section rotor disc and a stationary wall forward of a front face of the rotor disc or rearward of a rear face of the rotor disc, wherein the method includes:

supplying a flow of compressed air bled from the compressor section to a plurality of air entry nozzles at the stationary wall, delivering the compressed air through the air entry nozzles into the cavity at an inlet swirl angle, and varying the inlet swirl angle between a first inlet swirl angle and a different second inlet swirl angle.

Thus the method can be performed with the engine of the first aspect.

The method may have any one or, to the extent that they are compatible, any combination of the following optional features.

The air entry nozzles may be circumferentially spaced around the stationary wall. The air entry nozzles may be at substantially equal radial positions.

The method may further include feeding the delivered air: to seal the rim of the rotor disc against working gas ingestion, and/or to ventilate the fixing for rotor blades attached to the rim of the rotor disc, and/or to feed downstream cavities and seals.

The first inlet swirl angle can be a positive angle, and the second inlet swirl angle can be a positive angle less than first swirl angle, a zero angle or a negative angle. For example, the first inlet swirl angle may be in the range from +45° to +90°.

A first portion of the air entry nozzles may provide the first inlet swirl angle, and a second portion of the nozzles may provide the second inlet swirl angle, the supplied compressed air being switched between the first and the second portions to vary the inlet swirl angle. For example, nozzles of the first and second portions can alternate with each other in the circumferential direction around the stationary wall.

In the varying step, the compressed air may switch between supplying only the nozzles of the first portion and supplying only the nozzles of the second portion. However, preferably, in the varying step, varying proportions of compressed air may be supplied simultaneously to the nozzles of the first and the second portions.

The first portion of the air entry nozzles may be used to reduce windage losses during steady-state engine operation. The second portion of the air entry nozzles may be used for tip clearance control during engine thermal transients.

The first and second portions of the nozzles can be at the same radial height. Alternatively, the first portion of the nozzles can be at a first radial height and the second portion of the nozzles can be at a different second radial height. A further option is that some of the nozzles of the first portion are at a first radial height and others of the nozzles of the first portion are at a different second radial height. Likewise, some of the nozzles of the second portion can be at the first radial height and others of the nozzles of the second portion can be at the second radial height.

BRIEF DESCRIPTION OF THE SEVERAL VIEWS OF THE DRAWINGS

Embodiments of the invention will now be described by way of example with reference to the accompanying drawings in which.

DETAILED DESCRIPTION OF THE INVENTION

Figure 1:
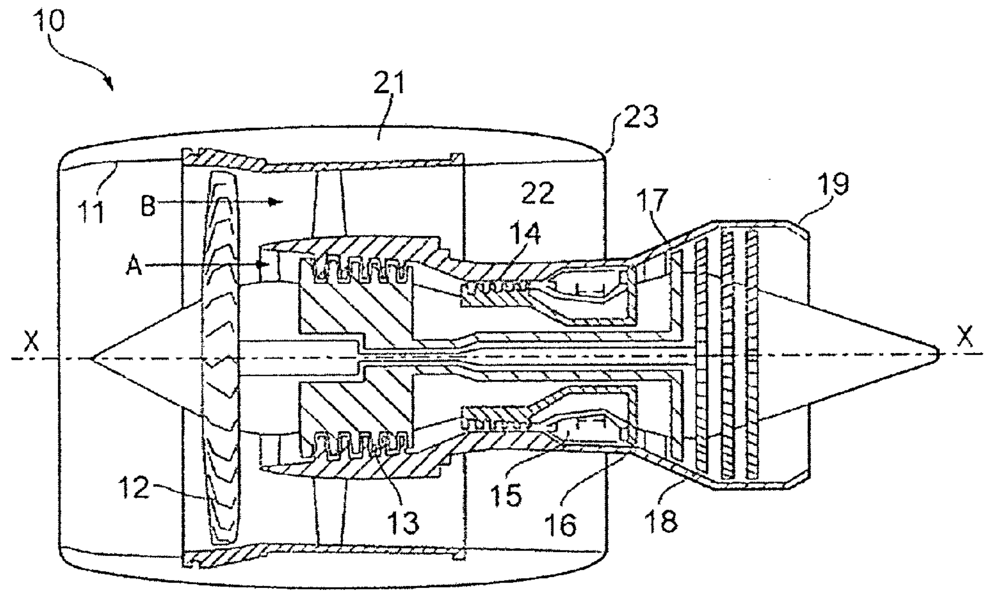
Prior Art FIG. 1
FIG. 1 shows a schematic longitudinal cross-section through a ducted fan gas turbine engine.
Figure 2:
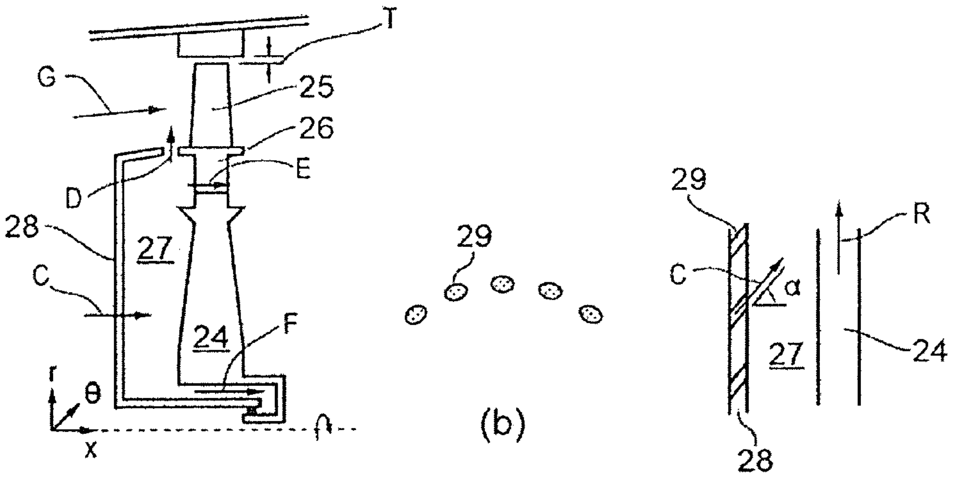
FIG. 2 shows schematically (*a*) a view on a longitudinal cross-section of a rotor disc of an intermediate-pressure turbine of an engine, (*b*) a view along the axis of the engine of a part of the downstream face of a stationary wall forward of the rotor disc, and (*c*) part of a hoop section through the stationary wall and the rotor disc at the radial position of air entry nozzles in the stationary wall.
Figure 3:
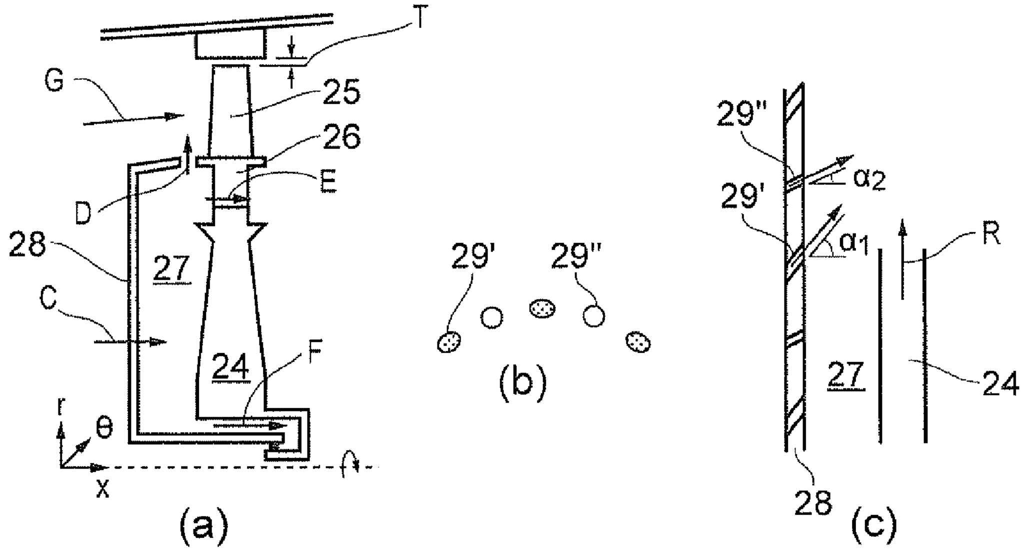
FIG. 3 shows schematically (*a*) a view on a longitudinal cross-section of a rotor disc of an intermediate-pressure turbine of an engine according to an embodiment of the present invention, (*b*) a view along the axis of the engine of a part of the downstream face of a stationary wall forward of the rotor disc, and (*c*) part of a hoop section through the stationary wall and the rotor disc at the radial position of air entry nozzles in the stationary wall.

FIG. 3 shows schematically (*a*) a view on a longitudinal cross-section of a rotor disc 24 of an intermediate-pressure turbine of an engine according to an embodiment of the present invention, (*b*) a view along the axis of the engine of a part of the downstream face of a stationary wall 28 forward of the rotor disc, and (*c*) part of a hoop section through the stationary wall and the rotor disc at the radial position of air entry nozzles 29', 29" in the stationary wall. Similar features in FIGS. 2 and 3 share the same reference numbers in both figures.

Unlike the engine of FIG. 2, the stationary wall 28 of the engine of FIG. 3 has a first portion of air entry nozzles 29' which each provide a first inlet swirl angle $\alpha_1$, and a second portion of air entry nozzles 29" which each provide a different second inlet swirl angle $\alpha_2$. The first and the second nozzles alternate circumferentially around the wall, although other arrangements of nozzles are possible (for example, groups of first and second nozzles may alternate circumferentially around the wall, and there may be different numbers of first and second nozzles). The first inlet swirl angle is in the range from +45' to +80°, and the second inlet swirl angle is a positive angle which is less than first swirl angle, a zero angle or a negative angle.

Figure 4:
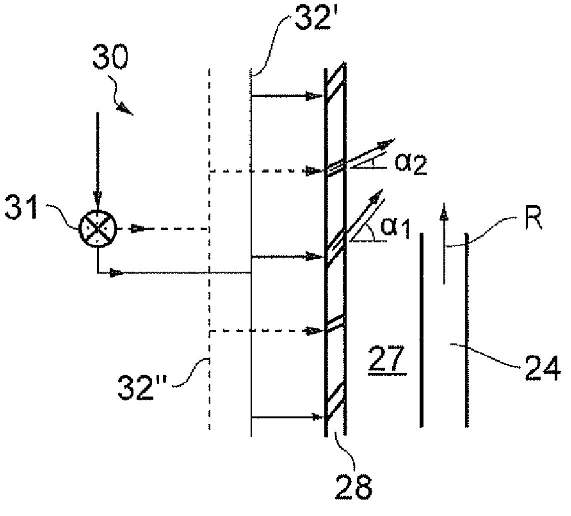
FIG. 4 shows schematically a cooling air supply arrangement for the air entry nozzles of FIG. 3.

The engine also has a cooling air supply arrangement 30, which is shown schematically in FIG. 4, and which accepts a flow of compressed air bled from the compressor section of the engine and supplies the compressed air to the air entry nozzles 29', 29" for delivery into the cavity. The cooling air supply arrangement accepts compressed air bled from the compressor section of the engine and supplies the compressed air to the nozzles. The arrangement comprises a two-position valve 31, and first 32' ductwork and second 32" ductwork which lead from the valve to respectively the first nozzles 29' and the second nozzles 29". Thus by actuating the valve, the supplied air can be switched between the first and the second nozzles. The valve can be inboard or outboard of the working gas annulus of the engine.

The first nozzles 29' provide a large swirl angle $\alpha_1$ in the direction of rotation R of the disc 24, and are used for windage reduction. The second nozzles 29" provide a smaller swirl angle $\alpha_2$ in the direction of rotation R, or even a zero or negative swirl and are used for transient tip clearance improvement. A typical mode of valve scheduling would be for the first nozzles to be operated during steady-state engine operation and for the second nozzles to be operated for a period of time during engine thermal transient heating and cooling phases. In this way, an optimum swirl angle can be used for windage reduction at certain operating conditions, and, separately, an optimum swirl angle for control of tip clearance T can be used at other conditions.

Although the first and second nozzles are shown in FIG. 3 at the same radial position, an option is for them to be at different radial positions. For example, the first nozzles can be at a higher radius if their primary use is for optimising the swirl at the blade feed entry (exit E), and the second nozzles can be at a lower radius, if their primary purpose is to alter the HTCs the air flow generates on the disc front face.

Although the individual entry nozzles 29', 29" will usually be of circular cross-section, there is no restriction on their cross-sectional shape. There are also no requirements for the cross-sectional shapes of the first and second nozzles to be the same, and for the total flow areas of the first and second nozzles to be equal.

Instead of switching to the second nozzles 29" at all thermal transients, the valve scheduling could call for the switching to the second nozzles only for selected thermal transients, e.g. for cooling transients only.

The valve 31 can be of a multi-position or continuously-variable type instead of a two-position valve. In this way, at any point in time, the delivered air into the cavity 27 could be through both the first 29' and the second 29" nozzles. The amount of swirl can thus be optimised for different phases of flight.

The valve 31 could be of the vortex amplifier type disclosed in U.S. Pat. No. 7,712,317.

Figure 5:
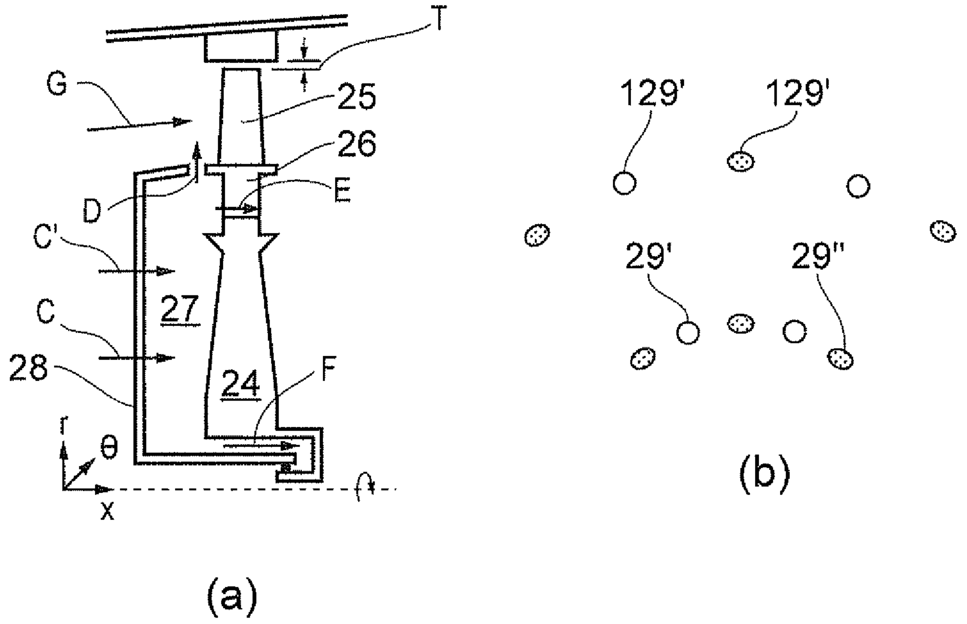
FIG. 5 shows schematically (*a*) a view on a longitudinal cross-section of a rotor disc of an intermediate-pressure turbine of an engine according to a further embodiment of the present invention, and (*b*) a view along the axis of the engine of a part of the downstream face of a stationary wall forward of the rotor disc.

FIG. 5 shows schematically (*a*) a view on a longitudinal cross-section of a rotor disc 24 of an intermediate-pressure turbine of an engine according to a further embodiment of the present invention, and (*b*) a view along the axis of the engine of a part of the downstream face of a stationary wall 28 forward of the rotor disc. Similar features in FIGS. 2, 3 and 5 share the same reference numbers. In the further embodiment, the stationary wall contains two sets of entry nozzles, a first set 29', 29" at a first radius indicated by the height of the arrow of cooling air C, and a second set 129', 129" at a second radius indicated by the height of the arrow of cooling air C'. A first portion of the air entry nozzles 29', 129' (drawn from both sets) provide the first inlet swirl angle $\alpha_1$, and a second portion of air entry nozzles 29", 129" (again drawn from both sets) provide the different second inlet swirl angle $\alpha_2$. The swirl angle can be determined by switching between the first portion and the second portion of the nozzles.

While the invention has been described in conjunction with the exemplary embodiments described above, many equivalent modifications and variations will be apparent to those skilled in the art when given this disclosure. For example, in FIGS. 3 to 5 the stationary wall 28 is shown forward of a front face of the disc 24. However, in other embodiments the stationary wall could be rearward of a rear face of the disc with the cooling air C, C' being delivered in the opposite axial direction. Accordingly, the exemplary embodiments of the invention set forth above are considered to be illustrative and not limiting. Various changes to the described embodiments may be made without departing from the spirit and scope of the invention.

All publications referenced above are hereby incorporated by reference.

The invention claimed is:

1. A gas turbine engine having in flow series a compressor section, a combustor, and a turbine section, the gas turbine engine including:

a turbine section rotor disk, a stationary wall forward of a front face of the rotor disk or rearward of a rear face of the rotor disk, the stationary wall defining a cavity between the stationary wall and the rotor disk, and having a plurality of air entry nozzles configured to deliver cooling air into the cavity at an inlet swirl angle, and a cooling air supply arrangement which accepts a flow of compressed cooling air bled from the compressor section and supplies the compressed cooling air to the air entry nozzles for delivery into the cavity;

wherein the cooling air supply arrangement and the air entry nozzles are configured to vary the inlet swirl angle of the compressed cooling air delivered into the cavity through the nozzles between a first inlet swirl angle and a different second inlet swirl angle, and wherein a first portion of the air entry nozzles provides the first inlet swirl angle, and a second portion of the air entry nozzles provides the second inlet swirl angle, the cooling air supply arrangement having a switching system for switching the supplied compressed cooling air between the first and the second portions to vary the inlet swirl angle.

2. A gas turbine engine according to claim 1, wherein:

the inlet swirl angle at a given air entry nozzle is defined as the angle between the direction of flow of the air delivered out of the exit of the given air entry nozzle, ignoring any radial component to the direction of flow, and a line parallel to the axial direction of the engine at said exit, a positive angle indicating swirl in the direction of rotation of the rotor disk, and a negative angle indicating swirl in the opposite direction of rotation to that of the rotor disk, the first inlet swirl angle is a positive angle, and the second inlet swirl angle is a positive angle less than first swirl angle, a zero angle or a negative angle.

3. A gas turbine engine according to claim 2, wherein the first inlet swirl angle is in the range from +45° to +90°.

4. A gas turbine engine according to claim 1, wherein the switching system is configured to simultaneously supply varying proportions of the compressed cooling air to the air entry nozzles of the first and the second portions.

5. A gas turbine engine according to claim 1, wherein the first portion of the air entry nozzles are at a first radial height and the second portion of the air entry nozzles are at a different second radial height.

6. A gas turbine engine according to claim 1, wherein:

some of the air entry nozzles of the first portion are at a first radial height and others of the air entry nozzles of the first portion are at a different second radial height; and some of the air entry nozzles of the second portion are at the first radial height and others of the air entry nozzles of the second portion are at the second radial height.

7. A method of operating a gas turbine engine having in flow series a compressor section, a combustor, and a turbine section, a cavity being defined between a turbine section rotor disk and a stationary wall forward of a front face of the rotor disk or rearward of a rear face of the rotor disk, the stationary wall having a plurality of air entry nozzles configured to deliver cooling air into the cavity at an inlet swirl angle, a first portion of the nozzles providing a first inlet swirl angle, and a second portion of the nozzles providing a different second inlet swirl angle, wherein the method includes:

supplying a flow of compressed cooling air bled from the compressor section, delivering the compressed cooling air through the air entry nozzles into the cavity at an inlet swirl angle, and switching the compressed cooling air supply between the first and the second portions of the air entry nozzles to vary the inlet swirl angle.

8. A method of operating a gas turbine engine according to claim 7, wherein switching the compressed cooling air supply comprises simultaneously supplying varying proportions of the compressed cooling air to the air entry nozzles of the first and the second portions.

* * * * *